United States Patent

[11] 3,555,235

| [72] | Inventors | William C. Darrow Vestal; Richard H. Holmwood, Binghamton; Keith A. Snyder, Vestal; Walter C. Treiber, Endwell, N.Y. |
|---|---|---|
| [21] | Appl. No. | 682,550 |
| [22] | Filed | Nov. 13, 1967 |
| [45] | Patented | Jan. 12, 1971 |
| [73] | Assignee | International Business Machines Corporation Armonk, N.Y. a corporation of New York |

[54] METALLIC SURFACE FUSION APPARATUS
9 Claims, 13 Drawing Figs.

[52] U.S. Cl.................................... 219/76,
219/124, 219/137, 310/23

[51] Int. Cl..................................... B23k 9/12,
B23k 9/04

[50] Field of Search........................................ 219/76, 74,
77, 121, 124, 125, 137; 310/23, 31

[56] References Cited
UNITED STATES PATENTS

| 2,679,620 | 5/1954 | Berry............................ | 219/124 |
| 3,023,302 | 2/1962 | Kennedy et al.............. | 219/74 |
| 3,024,349 | 3/1962 | Hinrichsen et al........... | 219/76 |
| 3,185,814 | 5/1965 | Rossner et al. ............. | 219/76 |
| 3,277,267 | 10/1966 | Blaszkowski................. | 219/76 |
| 3,415,970 | 12/1968 | Cline............................ | 219/76 |
| 3,098,150 | 7/1963 | Inoue............................ | 219/76 |
| 3,248,579 | 4/1966 | Plasko.......................... | 310/23 |
| 3,277,266 | 10/1966 | Blaszkowski................. | 219/76 |
| 3,448,307 | 6/1969 | Duris............................ | 310/23 |

*Primary Examiner*—J. V. Truhe
*Assistant Examiner*—Peter W. Gowdey
*Attorneys*—Hanifin and Clark and Henry E. Otto, Jr.

ABSTRACT: Apparatus for controlling intermittent contact at different points of a consumable element (such as an electrode) with a member (such as a workpiece to be locally hardened) by vibrating the element at high frequency and in such manner as automatically to compensate for consumption of the element and also accommodate and follow irregular contours on the member. Such apparatus is especially suitable for use in a metallic fusion system wherein a consumable electrode imparts its characteristics to the base metal of a workpiece.

PATENTED JAN 12 1971 3,555,235
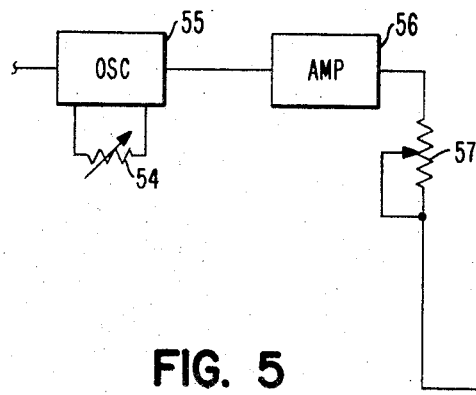
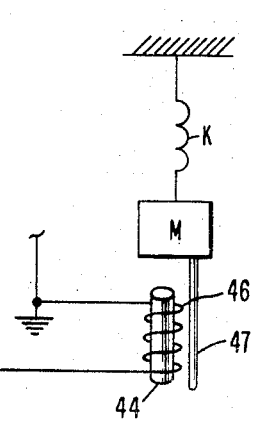
FIG. 5
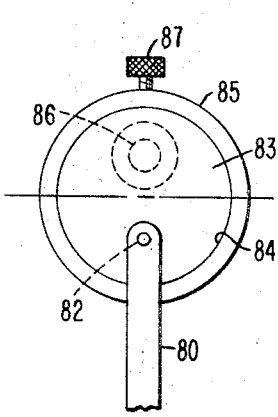
FIG. 8a
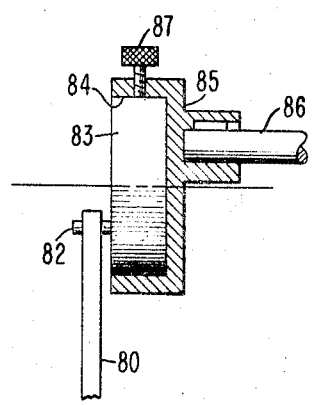
FIG. 8b
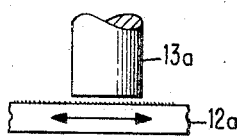
FIG. 9a
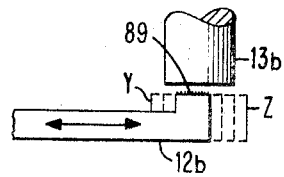
FIG. 9b
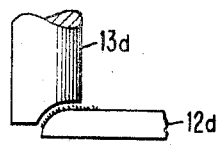
FIG. 9d
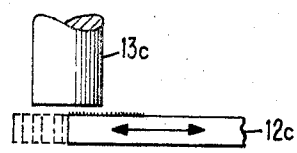
FIG. 9c

METALLIC SURFACE FUSION APPARATUS

BACKGROUND OF INVENTION

The invention relates to apparatus for maintaining an electrically conductive element, such as an electrode, within a predetermined distance from an electrically conductive surface, and relates more particularly to a metallic surface fusion system employing such apparatus.

It is old to provide an electrical discharge machining apparatus which compensates for consumption of an electrode by advancing an electrode holder rectilinearly in increments toward a workpiece whenever the electrode must be moved more than a preselected amount toward the workpiece to perform a metal-removing operation. However, such apparatus is controlled by mechanical actuation of a switch upon excessive travel, effects corrections only a small increment at a time, and provides no means for moving the electrode both toward and away from the workpiece automatically as necessary to compensate for variations in contour of the workpiece.

It is also known to provide a handgun which supports an electrode of tungsten carbide or the like and is activated by alternating current to oscillate the electrode to cause it to add a hard work surface wherever the electrode is brought manually into fusing contact with such surface. However, the frequency of vibration is low (e.g., about 150 Hz.); also, the electrode cannot be controlled accurately to provide the optimum electrode contact time and impact for the particular type of fusion desired. Accordingly, this type of handgun-supported vibrating electrode is not suitable for industrial applications where extreme accuracy and/or high throughputs are required.

SUMMARY OF INVENTION

According to the invention, apparatus is provided for vibrating an electrode at high frequencies (i.e., in excess of 1,000 Hz.) and with amplitudes of vibration small enough to maintain the electrode within .005 inches of the surface of a workpiece to be treated. Also, this apparatus comprises an electrode-positioning means which is controlled by the intermittent contact of the electrode with a work surface in such manner as to move the electrode continuously toward or away from said work surface automatically and whatever distance is necessary to compensate not only for electrode consumption but also for variations in elevational contour of the surface.

The apparatus and metallic surface fusion system embodying the invention provide these highly desirable features, as will be understood from the following more detailed description of the invention and from the accompanying drawings, wherein:

FIG. 5 is a schematic circuit diagram of the circuitry for driving the electrode assemblage at resonant frequency and controlling the amplitude of vibration of the electrode;

Figure 1:
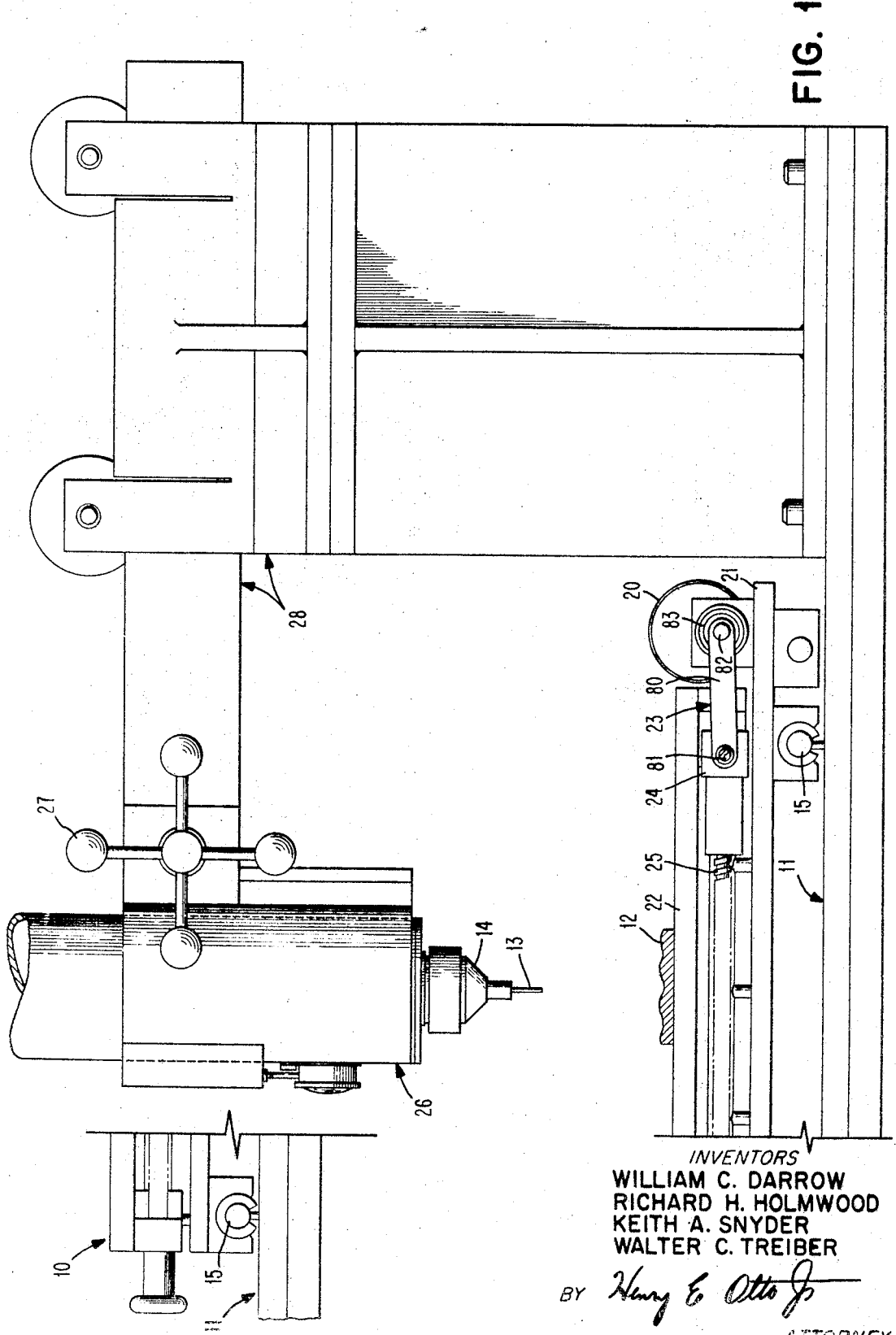
FIG. 1 is a side elevational view of an apparatus embodying the invention.

FIGS. 8A and B are elevational section and fragmentary side elevational views respectively, to enlarged scale of a sweep control mechanism shown in FIG. 1; and FIGS. 9A, B, C and D show schematically the advantages of the sweep motion imparted to the workpiece by the mechanism of FIG. 8.

DESCRIPTION OF PREFERRED EMBODIMENT

Figure 2:
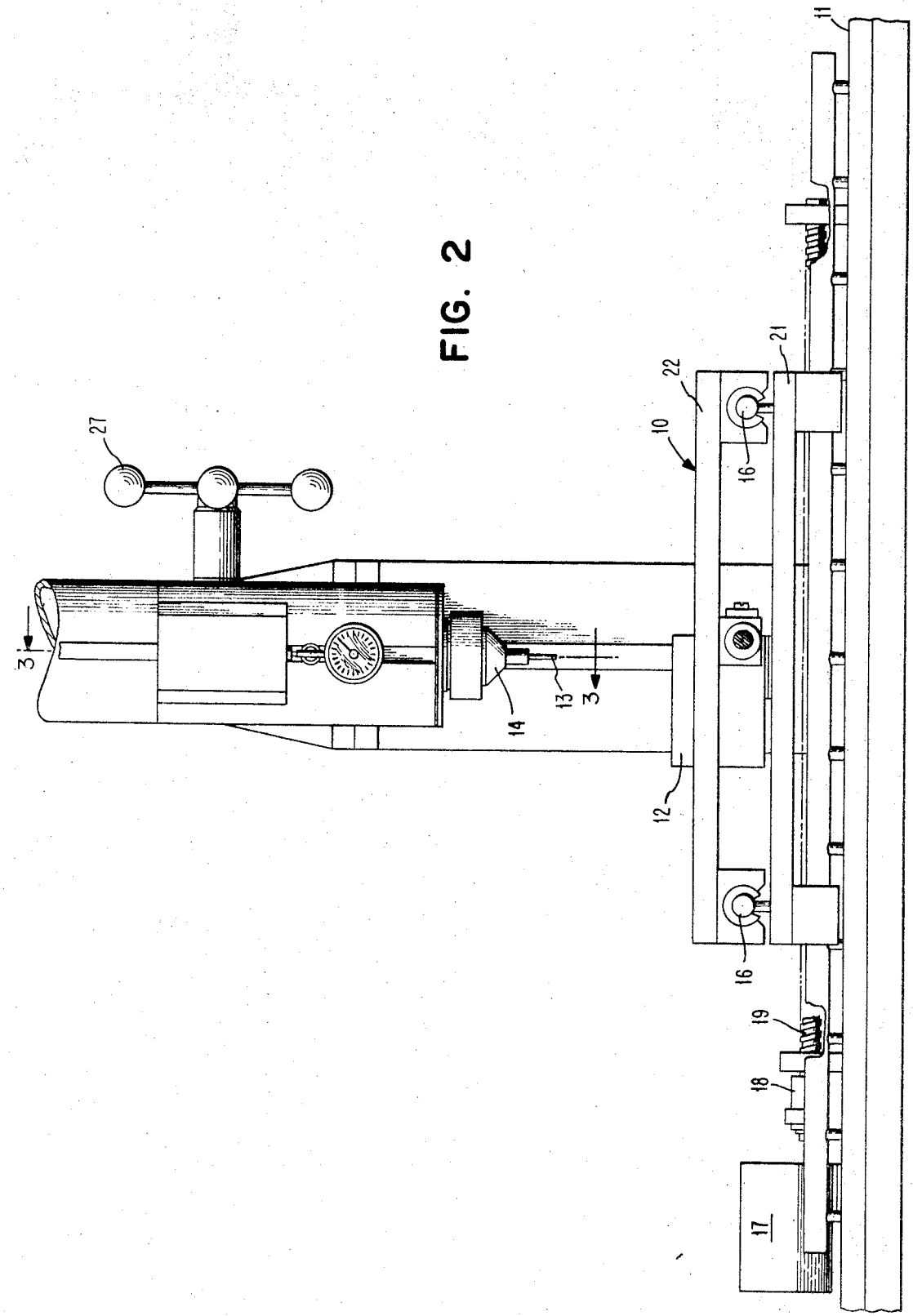
FIG. 2 is a front elevational view of said apparatus.

As illustrated in FIGS. 1 and 2, the apparatus embodying the invention comprises a platform, designated generally 10, which is frictionlessly mounted on a stationary base 11 and supports a workpiece 12 for movement in X-and/or Y-coordinate directions. An electrode 13 is supported by a carrier device 14 for movement in the Z-coordinate direction toward and away from the platform 10 and workpiece 12.

More specifically, platform 10 is supported by two frictionless ball slides 15 for the X-coordinate and two ball slides 16 for the Y coordinate. Platform 10 is driven in the X-axis by a variable speed motor 17 through a slip clutch 18 and a ball nut (not shown) and screw 19. Platform 10 is driven in the Y-axis by a variable speed motor 20 that is mounted on lower platform portion 21 but coupled to the upper platform portion 22 through a sweep control mechanism 23 and a ball nut 24 and screw 25. Mechanism 23 is adjustable, in the manner hereafter described, to cause the platform to be reciprocated in the Y-axis at any selectable amplitude and frequency from zero to a predetermined maximum, for reasons presently to be explained.

The electrode carrier device 14 forms part of an electrode-positioning device 26. Device 26 is movable in the Z-axis by manual rotation of a crank 27, which acts through a rack and pinion mechanism (not shown) to move device 26 relative to a fixed support structure 28 that is mounted on base 11.

Figure 3:
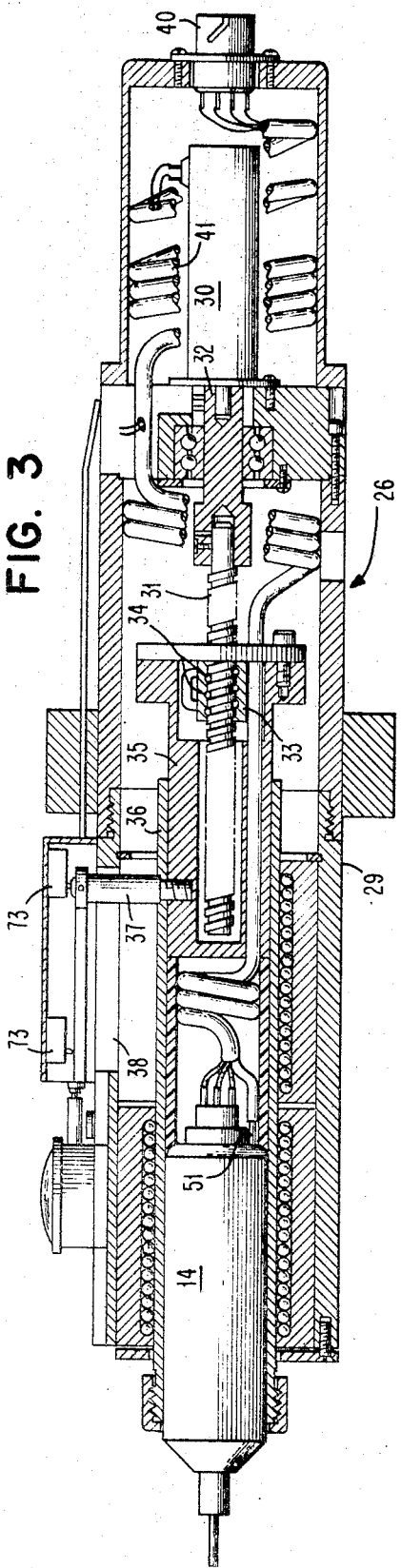
FIG. 3 is a sectional view, taken along the line 3–3 of FIG. 2 and to enlarged scale, of an electrode-positioning device forming part of said apparatus.

As illustrated in FIG. 3, the electrode-positioning device 26 comprises, briefly, a hollow sectionalized casing 29 containing a high-speed reversible servomotor 30, which is adapted to rotate a helical screw 31 either clockwise or counter-clockwise. Screw 31 is constrained against axial movement by being clamped to an extension 32 of the servomotor shaft (not shown). A ball nut 33 has a plurality of balls 34 that roll in the helical grooves of screw 31 for translating rotary motion of the screw with minimal friction into longitudinal movement of the nut in the following manner. Nut 33 is secured, as by screws, to a hollow member 35 that, in turn, is pinned to an encircling sleeve 36 to form an assemblage 33, 34, 35, 36 that is movable as a unit; and a radially extending pin 37 rides in a longitudinal slot 38 in casing 29 and is secured to said assemblage to constrain nut 33 against rotation upon rotation of screw 31. Thus, in well-known manner, an increment of rotary movement of the servomotor shaft extension 32 and hence the screw 31 will be translated into a corresponding increment of translational or rectilinear movement of the assemblage 33, 34, 35, 36 and thereby of the electrode carrier device 14 secured within said assemblage. The servomotor 30 and device 14 are controlled, in the manner hereafter described, from suitable sources of electrical energy by means of a connector 40 and cable 41.

Figure 4:
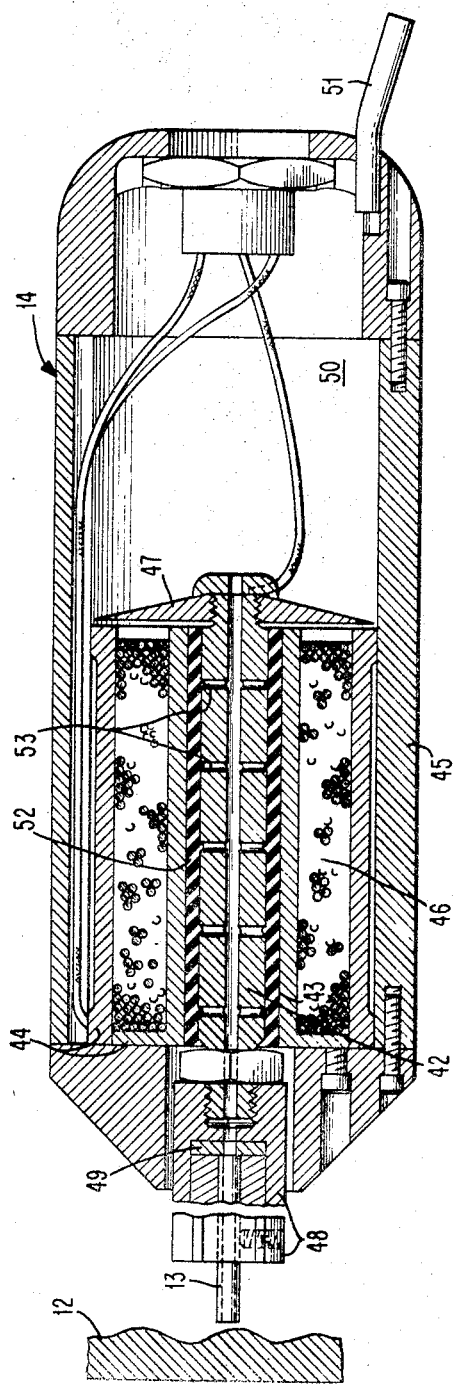
FIG. 4 is a sectional view to further enlarged scale of an electrode carrier device forming part of said electrode-positioning device.

As illustrated in FIG. 4, device 14 comprises a hollow stainless steel shaft 42 which passes with considerable radial clearance axially through a central bore 43 in a concentrically arranged slotted magnetic shell-type core 44 that is fixedly mounted within a hollow sectionalized casing 45 of aluminum or other non magnetic material. When a coil winding 46 of the core 44 is energized, it will produce a magnetic field for causing an armature 47, that is screw-thread-connected about the upper end of hollow shaft 42, to be attracted to the core. About the lower end of shaft 42 is screw-thread-connected an electrode holder 48 that holds the coaxially arranged electrode 13. Holder 48 preferably is fluted to enhance heat dissipation and counterbored at its lowermost portion to carry a backstop 49 of hard material for the electrode.

As illustrated, the shaft 42, backstop 49 and electrode 13 are hollow so that a suitable gas may be conveyed from a chamber 50 within casing 45 through the electrode 13 to the surface of workpiece 12, which is desirable for certain forms of metallic surface fusion; and in such case, the gas preferably would be fed to chamber 50 via flexible tubing 51 that is suitably admitted to device 26 through the wall of casing 29. However, if preferred, the electrode, and hence the shaft and backstop, may be solid; in which case the tubing 51 may be dispensed with.

According to an important feature of the invention, the annular space defined between shaft 42 and bore 43 is completely filled with a silicone rubber compound 52 that becomes rubberlike when cured in air. This compound may be of the type marketed by General Electric Company under the trade name "Clear Seal." To facilitate curing, the hollow shaft 42 is preferably provided with a plurality of radial openings 53. The length and annular area of the annular space and the number and size of the openings 53 to be filled with the rubber compound were carefully determined in the following manner to cause the armature shaft, holder, backstop and electrode assembly 47, 42, 48, 49, 13 to resonate at a desired frequency:

As denoted schematically in FIG. 5, $$T = 2\pi \sqrt{\frac{M}{K}}$$

where:
$T$ = the period of vibration of the mass in seconds
$M$ = mass in slugs of the moving assembly (47, 42, 48, 49, 13)
$K$ = spring rate in shear in pounds per foot of the rubber compound And $$K = C \frac{A}{D}$$

where:
$C$ = 10, 384 pounds per square foot
$A$ = average cross sectional area in square feet of the annulus; i.e., $$\frac{\pi}{2}$$

(diameter of bore 43 plus diameter of shaft 42) (length of bore 43)
$D$ = average thickness in feet of the silicone rubber compound of the annulus; i.e., ½ (diameter of bore 43 minus outer diameter of shaft 42)

By using these general relationships, in actual practice the assembly 47, 42, 48, 49, 13 was made resonant at a frequency of 1.000 Hz.; and the device was operated with the assembly at this resonant frequency to desirably maximize the vibration amplitude for a given energy input.

The circuit for driving assemblage 47, 42, 48, 49, 13 and hence the electrode 13 at the resonant frequency and controlling the amplitude of the electrode relative to the workpiece 12 also desirably includes a rheostat 54 connected to control the frequency of an oscillator 55 which, in turn, is connected through a power amplifier 56 and another rheostat 57 to the core winding 46. Rheostat 54 is always adjusted to make the mechanical assembly 47, 42, 48, 49, 13 resonate; and rheostat 57 is used to adjust the degree of amplitude at the resonant frequency.

It will thus be seen that the silicone rubber material desirably serves three purposes: it isolates electrode 13 electrically from the core 44 and casing 45; it supports the electrode and armature 47 in coaxial relation with the core; and, most important, it serves as an essential part of the resonant mechanical assemblage.

Operation of servomotor 30 is controlled by a suitable circuit, so as automatically to move the electrode carrier device 14 toward and away from the workpiece 12 as necessary to maintain the electrode 13 within the aforementioned preselected .005 inches of the workpiece surface, irrespective of changes in elevational contour thereof. This circuit may be of the type schematically illustrated in FIG. 6, wherein the positive terminal of direct current source 39 is electrically connected to electrode 13 via a lead 59; and the negative terminal is electrically connected through a rheostat 60, lead 61 and resistor 62 to ground and to workpiece 12; and a variable capacitor 63 is connected to ground via a branch of lead 59, thus providing a shunt connection between the electrode and workpiece. A branch of lead 61 is connected to an amplifier 64, the output of which is connectable to servomotor 30 in the following manner.

A double-pole, double-throw control switch 65 has an upper contact arm 66 that is connectable to an upper contact 67, and a lower contact arm 68 that is connectable to contact point 69 or 70. Contact arm 68 is connected to upper and lower contact points 71, 72 of a limit or safety switch 73. Switch 73 also includes upper and lower movable contact arms 74, 75, respectively, which are normally spring biased into contact with points 71, 72, respectively. Contact point 70 is connected to arm 74 and also to the servomotor 30. The output from amplifier 64 is connected to contact point 69 and also to arm 75. As previously noted, pin 37 (FIG. 3) is connected to assemblage 33—36; hence, it will move up and down with the electrode 13 as the latter is moved axially by carrier device 14. Pin 37 is adapted mechanically to unseat arms 74, 75 (see FIG. 6). If the electrode 13 and hence pin 37 move above a predetermined range, pin 37 will break contact 71—74; and if the electrode moves below said range, pin 37 will break contact 72—75. Thus, with control switch 65 in an upper position, as shown, the output from amplifier 64 will be connected to the servomotor 30 only if the electrode is within said range and permits closure of both sets of contacts 71—74 and 72—75 of switch 73. If switch 65 is in a lower position, the amplifier output will be connected to servomotor 30 via contacts 75—72 and 68—70, in bypass of contact 71—74. Switch 65 normally is in an intermediate position, in which it effects no electrical connections whatsoever, for reasons hereafter explained.

Figure 7:
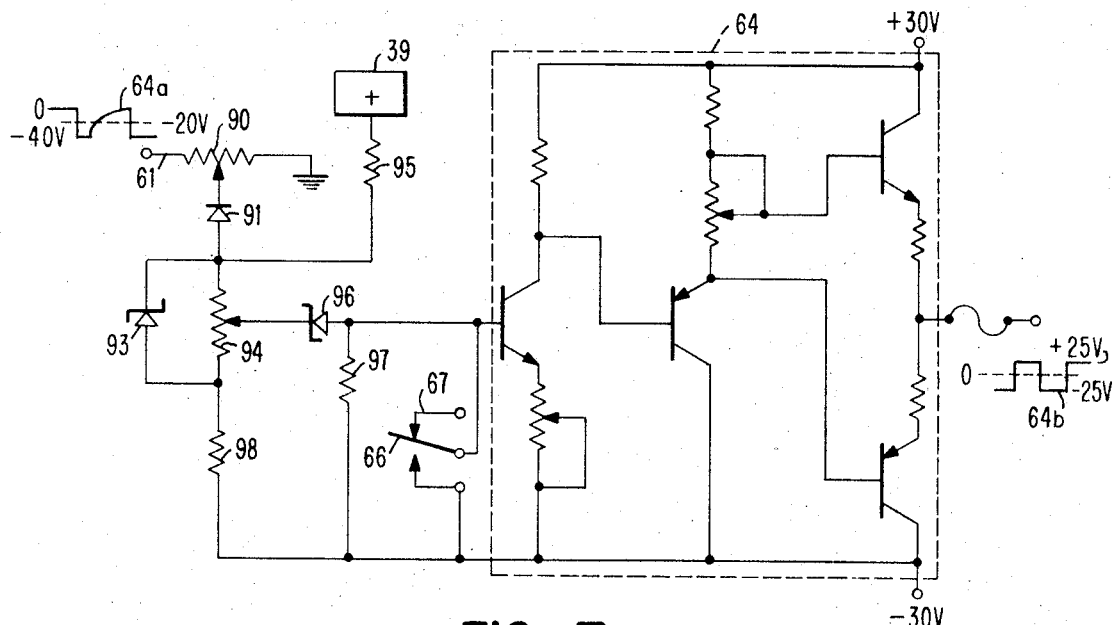
FIG. 7 is a circuit diagram of an amplifier included in the circuit of FIG. 6.

As illustrated in FIG. 7, amplifier 64 is of the three-stage type and converts an input signal 64a that varies between O and −40 v. into a substantially square-wave output signal 64b that varies between +25 and −25 v. As will be understood by those skilled in the art, this amplifier 64 provides level shifting at the input, and a push-pull output.

As earlier noted, the sweep control mechanism 23 is adjustable to cause platform 10 to be reciprocated in the Y-axis at any selectable amplitude and frequency from zero up to a predetermined maximum. As best shown in FIGS. 1 and 8, this mechanism includes a crank arm 80 pivotally connected by pins 81, 82 to ball nut 24 and a cylindrical member 83. Member 83 is rotatably disposed within a bore 84 provided in one end of an outer member 85 that is keyed to the output shaft 86 of motor 20. For maximum sweep, members 83 and 85 are locked by a set screw 87 in the relative rotative positions shown in FIG. 8, wherein the centerlines of the shaft 86 and pin 82 are disposed a maximum distance apart. To provide no sweep, the members 83 and 85 are positioned such that the centerlines of 86 and 82 coincide; and to provide some intermediate degree of sweep, the members 83 ad and 85 are locked with the said centerlines at some correspondingly appropriate distance apart. Thus, when motor shaft 86 and hence the members 83, 85 are rotated as a unit, crank 80 will be reciprocated with an eccentric motion, the degree of "throw" or "sweep" being a function of twice the distance between the axes of shaft 86 and pin 82.

The purpose of the sweep motion will best be understood by reference to FIGS. 9A—D. As illustrated in FIG. 9A, the workpiece 12a has a surface to be treated which is wider than the electrode; and the workpiece is therefore reciprocated a degree necessary to sweep the entire width of such surface. In FIG. 9B, the surface to be treated on workpiece 12b is a ledge 89 which is narrower than the electrode; and in such case, the workpiece is reciprocated an amount equal to the distance between Y and Z less the width of said ledge. To treat parts of tools having sharp corners or edges, such as punches and dies, the corner corner or edge of the workpiece 12c is reciprocated such that the left edge of electrode 13c is alternately inside and outside the edge of the workpiece, as illustrated in FIG. 9C.

It will thus be seen that sweep motion under the variety of conditions illustrated in FIGS. 9A, 9B and 9C eliminates the need for dressing the electrode periodically to make it flat because the electrode material is transferred to the workpiece to an equal degree over the full width of the electrode. By way of contrast, FIG. 9D illustrates how the electrode 13d wears unevenly when attempting to treat a corner or edge of a workpiece 12d when no reciprocating or sweeping motion is employed.

OPERATION

Figure 6:
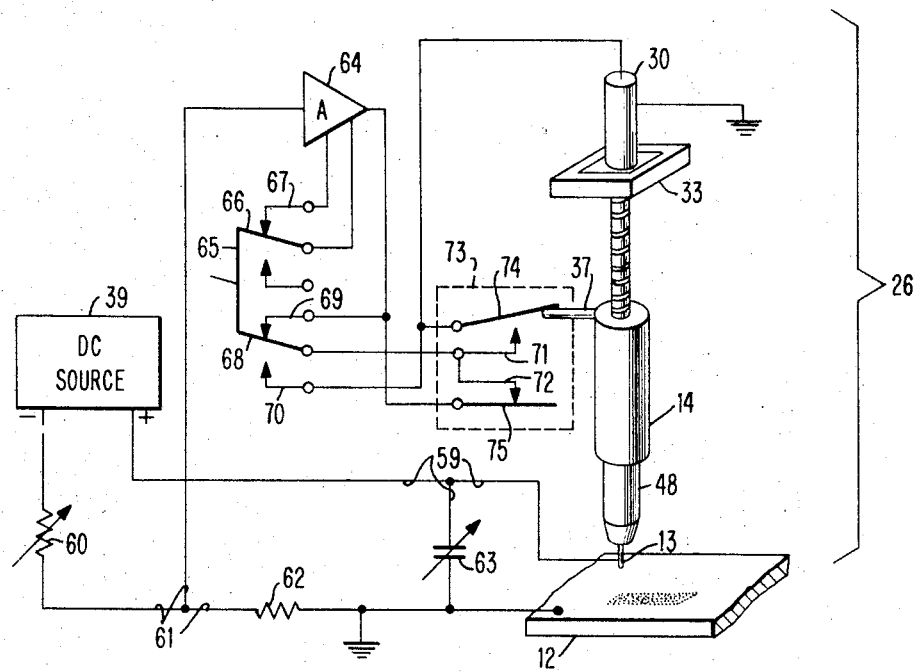
FIG. 6 is a schematic diagram of the control circuitry for the electrode-positioning device of FIG. 3.

Assume initially that electrode 13 is in its uppermost position, in which arm 76 breaks contact 71—74; and that control switch 65 is in its upper position, in which it makes contacts 66—67 and 68—69. Under these conditions, the various components will be in the respective positions in which they are shown in FIGS. 6 and 7.

To advance electrode 13 downward into contact with the workpiece 12, switch 65 is moved to its lower position. In such position, contacts 66—67 and 68—69 are broken; and contact 68—70 is made. With contact 66—67 open, the signal in wire 61 becomes the true input to amplifier 64. Since electrode 13 is not yet in contact with workpiece 12, no current will flow through resistor 62 and hence wire 61 and hence the input to amplifier 64 will be at ground potential, producing a negative potential at the output. Meanwhile, with contact 68—70 made, the negative voltage output of amplifier 64 will be applied to servomotor 30 via contact 72—75 in bypass of the then open contact 71—74. This negative voltage will cause the shaft of servomotor 30 to rotate counterclockwise, and through lead screw 31 start moving the carrier device 14 and hence electrode 13 downward toward the workpiece 12. During the initial phase of this downward movement, contact 71—74 will close; the switch 65 thus provides a temporary bypass for the upper limit of safety switch 73 so that downward movement may be initiated. After contact 71—74 closes, switch 65 should be moved to an intermediate position, wherein arms 66 and 68 are disengaged from all contact points. This is to reinstate the safety function of contact 71—74, which had to be temporarily bypassed, and yet continue to cause the signal in wire 61 to constitute the true input to amplifier 64.

Meanwhile, since the leads 59, 61 are connected to source 39, capacitor 63 will be charged. Hence as soon as the downwardly moving electrode 13 contacts workpiece 12, the positive terminal of source 39 will be connected to ground, and the resultant short circuit will cause capacitor 63 to discharge. While the electrode 13 is in contact with workpiece 12, current will also flow from source 39 via a circuit including 59, 13, 12, 62, 61, 60.

Meanwhile, it will be recalled that electrode 13 will be vibrated axially relative to device 14 at high frequency by the circuitry disclosed in FIG. 5 and already described. Hence, the contact of electrode 13 with the workpiece 12 will be intermittent; i.e., successively and rapidly made and broken. This will result in intermittent current flow from source 39 through circuit 59, 13, 12, 62, 61, 60 while the electrode contacts the workpiece, and recharge of a capacitor 63 when such contact is broken.

This current flow through resistor 62 each time the electrode contacts the workpiece causes a voltage drop across said resistor, thus providing a negative voltage signal in wire 61. This negative voltage signal is modified and amplified in the following manner to cause the shaft of servomotor 30 to be rotated clockwise and thus through screw 31 tend to raise or retract the electrode 13 out of contact with workpiece 12. A portion of this signal 64a (FIG. 7) in wire 61 is fed via a potentiometer 90 and a diode 91 to a wire 92 and thence in parallel to a zener diode 93 and one end of a potentiometer 94, as well as to resistor 95 that is connected to the positive terminal of source 39. The other end of potentiometer 94 is connected via a resistor 98 to a −30 v. direct-current source. The divider arm of potentiometer 94 is connected via a zener diode 96 and resistor 97 to the said −30 v. direct-current source. Resistor 95 serves as an interlock to prevent downward movement of the electrode 13 by the servomotor 30 if source 39 is not functioning properly; without resistor 95, amplifier 64 would never realize when electrode 13 had contacted workpiece 12, and the servomotor 30 would continue to drive the electrode carrier device 14 downward and thus damage the apparatus. Zener diode 93 is operated in its conducting state and alternating current is superimposed thereon; hence all the alternating current signal appearing at v also appears at w. This enables potentiometer 94 to function only as a direct-current level control without changing the amplification or gain of the amplifier 64. The zener diode 96 changes the direct-current level of the unattenuated signal fed into it from potentiometer 94. Potentiometer 94 is adjusted to provide a desired period of contact of the electrode 13 with the workpiece 12. Note also that the signal in wire 61 will represent the true input to amplifier 64 only when contact 66—67 is open. When contact 66—67 is closed via switch 65 in upper position, the input to amplifier 64 will be changed to −30 v. and modify the amplifier output to +25 v.

Upon completion of the fusion operation, switch 65 is moved to its upper position. This modifies the input to and output from the amplifier 64, as above described, to cause electrode carrier device 14 to move upwardly until pin 37 strikes arm 74 and opens contact 71—74. This will shut off power to servomotor 30 and terminate upward movement of device 14 and hence of electrode 13.

It will thus be seen that the electrode carrier device 14 and electrode 13 move downward as a unit when the work operation is initiated by closure of contact 68—70 of switch 65; and concurrently therewith the electrode 13 is being axially vibrated at high frequency and through very small amplitudes. The servomotor 30 operates to advance electrode 13 continuously toward workpiece 12 whatever degree is necessary (within the range prescribed by the safety switch 73) until contact is made between electrode 13 and workpiece 12; and thereafter the servomotor operates automatically to compensate not only for electrode consumption but also for changes in elevational contour of the workpiece as contact is effected intermittently between the electrode and workpiece under control of the vibratory control circuitry shown in FIG. 5. With contact 66—67 of switch 65 open, when there is no contact between the electrode and workpiece, the output of amplifier 64 is about −25 v.; and when there is such contact, the output is about +25 volts. The servomotor 30 will operate as an averaging device; i.e., it is responsive to that portion of the period of vibration when the electrode is in contact with the workpiece, which period is adjustable according to the setting of potentiometer 94.

In practice, with apparatus embodying the invention, it was found that change in electrode mass due to consumption was negligible compared to the total mass M of the assemblage 47, 42, 48, 49, 13. Hence the change in resonant frequency caused by electrode consumption is substantially negligible. Also, it was found that when fusing a deposit of tungsten carbide, for example, from an electrode onto a workpiece, the thickness of the deposit could be controlled within .0002 inches to provide a desired degree of deposit thickness of between .0002 inches and .001 inches; that, in a single pass, the band width of treatment could be controlled to between one sixty-fourth inches and one eighth inches according to the electrode width selected; and treatments were successfully applied at rates of up to 2 inches per minute. The metallurgically bonded layer thus formed provided a Rockwell hardness greater than RC 70 and the wear-life of the treated area was prolonged between 100 and as much as 1,500 percent.

It will be understood that the ability of the apparatus to compensate for changes in elevational contour is a function of the relative velocities in the X-(and/or Y-) directions as compared to the velocity and vibration frequency in the Z-direction. Thus, as vertical response time is shortened and/or vertical velocity increased, the apparatus can accommodate more abrupt changes in elevational contour. Also, the electrode carrier device 14 and hence electrode 13 are preferably movable in a vertical or a Z-direction, as illustrated; however, if desired, the device 14 could be moved in an arcuate or other lineal path, but with the axis of the electrode being maintained vertical. Moreover, it will be understood that many different types of localized alloying may be accomplished, e.g., tungsten carbide, gold, or chromium may be transferred from a suitable electrode to selectable points or areas on a workpiece. The transfer may be at selected spaced points or along a continuous straight line or curved path, according to the manner in which the workpiece is moved in the X- and Y-directions. Such movement may, if desired, be controlled by an apparatus, such as described in U.S. Pat. No. 2,741,732, which translates a digital tape input into analogue movement of a servotable in any programmed horizontal path.

While the invention has been particularly shown and described with reference to a preferred embodiment thereof, it will be understood by those skilled in the art that the foregoing and other changes in form and details may be made therein without departing from the spirit and scope of the invention.

We claim:

1. In an apparatus for controlling movement of an electrically conductive element into intermittent contact with an electrically conductive surface of a member to perform a desired operation thereon;
    a carrier device for moving the element in a substantially continuous manner and in a prescribed lineal path selectively into contact with and out of contact with the surface;
    an assemblage forming part of said carrier device and rigidly connected to the element and resiliently connected to the remaining portion of said device by a resilient electrically nonconductive medium;
    means including an electrical circuit for vibrating said assemblage and element at substantially resonant frequency relative to said remaining portion, such that the element is movable concurrently and with two types of motion, namely, a high-frequency vibratory motion and a continuous lineal motion;
    said carrier device forming part of a positioning device comprising:
        a servomotor having a reversely rotatable shaft;
        helical screw means operatively secured to said shaft for rotation thereby;
        means rigidly secured to said remaining portion of said carrier device and having balls which ride in the helical grooves of said screw means; and
        men means for constraining the last introduced means against rotation to cause any degree of rotary motion of the screw means in a clockwise or counterclockwise direction to be translated into a corresponding degree of translational movement of said remaining portion in one axial direction or the opposite axial direction, respectively.

2. Apparatus according to claim 1, including means physically movable by and with said remaining portion for interrupting the supply of electrical energy to the servomotor when said remaining portion is moved beyond a preselected limit position in at least one axial direction.

3. In an apparatus for controlling movement of an electrically conductive element into intermittent contact with an electrically conductive surface of a member to perform a desired operation thereon;
    a carrier device for moving the element in a substantially continuous manner and in a prescribed constrained axial path selectively into contact with and out of contact with the surface;
    an assemblage forming part of said carrier device and rigidly connected to the element and resiliently connected to the remaining portion of said device by a resilient electrically nonconductive medium comprising a silicone rubber compound, said assemblage being provided with openings for receiving said compound to enhance the resilient interconnection of said assemblage with said remaining portion; and
    means including an electrical circuit for vibrating said assemblage and element at substantially resonant frequency relative to said remaining portion, such that the element is movable automatically and concurrently with two types of axial motion, namely, a high-frequency vibratory motion and a continuous axial motion.

4. Apparatus for controlling movement of an electrically conductive element into intermittent contact with an electrically conductive surface of a member to perform a desired operation thereon, comprising, in combination:
    carrier means supporting the element and comprising one means for effecting continuous high frequency vibratory reciprocation of the element;
    means for providing relative motion between the surface and element in a plane generally perpendicular to the axis of reciprocation of the element to cause the element to contact the surface at different points during successive reciprocations;
    means including a servomechanism responsive to an electrical signal of one level exceeding a preselected duration to move the carrier means and element as a unit away from the surface and to an electrical signal of another level exceeding another preselected duration to move the carrier means and element as a unit toward the surface;
    other means operative during and responsively to each contact of the element with the surface to provide the signal of said one level for substantially the duration of such contact and operative while the element is physically separated from the surface to provide the signal of said other level; and
    said servomechanism operating as an averaging device for automatically adjusting the position from which said element is reciprocated according to any variation in contour of said surface of a degree sufficient to cause contact and separation times to exceed said preselected durations during such relative movement in such plane.

5. Apparatus according to claim 4, wherein the relative-motion-providing means moves the member in X-and Y-coordinate directions in a selectable path, and the vibratory motion is reciprocal substantially in the Z-coordinate direction.

6. Apparatus according to claim 4, wherein said relative-motion-providing means is repetitively reciprocal in at least one of the X- and Y-directions; and including means for adjusting to a selectable value the amplitude of such reciprocal movement.

7. Apparatus according to claim 4 wherein:
    said element is an electrode and the surface forms part of a workpiece, and the electrode is consumed by metallurgical fusion with the surface of the workpiece during and as a result of such intermittent contact therewith to impart to the surface of the workpiece metallurgical characteristics similar to that of the electrode material; and
    said servomechanism operates to move the electrode toward the workpiece as necessary to compensate for electrode consumption as well as toward and away from the workpiece as necessary to compensate for changes in surface contour.

8. Apparatus for controlling movement of an electrically conductive element into intermittent contact with an electrically conductive surface of a member to perform a desired operation thereon, comprising:
    a carrier device comprising one portion rigidly connected to the element, another portion connected to said one portion by a rubberlike electrically nonconductive medium, and electromagnetic means successively energized and deenergized for effecting continuous high-frequency axial vibratory motion of the element and said one portion relative to said other portion; and
    means including a servomechanism mechanically connected to said carrier device and circuit means responsive to an electrical signal of one level generated while and so long as the element contact such surface to cause the carrier device to move one way as a unit to move the element away from such surface if said signal exceeds a preselected duration and responsive to an electrical signal of another level generated during physical separation of the element and surface to cause the carrier device to move the opposite way as a unit to move the element away from such surface if the latter signal exceeds a predetermined duration, thereby to cause the element to be movable concurrently with two types of superimposed motion, namely, a high-speed, low amplitude, continuous vibratory motion and a discontinuous motion of a direction and magnitude that varies automatically depending upon direction and degree of change in contour of the surface and any wear of the element, such that the position of the element will be varied automatically as necessary to compensate for element wear and variations in surface contour upon relative movement of the surface in a path transversely of the directions of superimposed motion of the element, while at the same time maintaining the element substantially within that preselected distance from the surface corresponding to the vibratory amplitude of the element at said frequency.

9. Apparatus according to claim 8, including:

means associated with said electromagnetic means for adjusting to a selectable magnitude the amplitude of high frequency vibratory motion; and means associated with said circuit means for adjusting to a selectable time interval the normal duration of contact of the element with the surface occurring when no change in contour exists.